United States Patent [19]

Altes

[11] Patent Number: 4,802,232

[45] Date of Patent: Jan. 31, 1989

[54] METHOD FOR REDUCING THE QUANTITY OF DATA IN IMAGE CODING

[75] Inventor: Harald Altes, Backnang, Fed. Rep. of Germany

[73] Assignee: ANT Nachrichtentechnik GmbH, Backnang, Fed. Rep. of Germany

[21] Appl. No.: 25,719

[22] Filed: Mar. 13, 1987

[30] Foreign Application Priority Data

Mar. 14, 1986 [DE] Fed. Rep. of Germany ....... 3608491

[51] Int. Cl.$^4$ ............................................ G06K 9/36
[52] U.S. Cl. ..................................... 382/56; 382/36; 382/41; 382/43; 382/49
[58] Field of Search .............. 358/133, 135, 136, 260, 358/261, 263; 364/725, 726, 727; 382/41, 43, 49, 56, 27, 36

[56] References Cited

U.S. PATENT DOCUMENTS

| | | | |
|---|---|---|---|
| 4,241,329 | 12/1980 | Bahler et al. ........................ | 382/17 |
| 4,394,774 | 7/1983 | Widergreen et al. ............... | 358/136 |
| 4,464,788 | 8/1984 | Sternberg et al. .................. | 364/725 |
| 4,698,672 | 10/1987 | Chen et al. .......................... | 358/136 |
| 4,698,689 | 10/1987 | Tzou .................................... | 364/725 |
| 4,703,349 | 10/1987 | Bernstein ............................. | 382/43 |
| 4,704,628 | 11/1987 | Chen et al. .......................... | 358/133 |

FOREIGN PATENT DOCUMENTS 2706080 8/1978 Fed. Rep. of Germany .
2460654 10/1985 Fed. Rep. of Germany .

OTHER PUBLICATIONS

A Subjectively Adapted Image Communication System by Herbert Lohscheller, IEEE Transactions on Communications, vol. Com-32, No. 12, Dec. 1984, pp. 1316–1322.

Piecewise Fourier Transformation for Picture Bandwidth Compression; Grant B. Anderson and Thomas S. Huang, IEEE Transactions on Communication Technology, Apr. 1971, pp. 133–140.

Scene Adaptive Coder; Wen-Hsiung Chen and William K. Pratt, IEEE Transactions on Communications, vol. Com-32, No. 3, Mar. 1984, pp. 225–232.

Vision Adapted Progressive Image Transmission, Herbert Lohscheller, Signal Processing II: Theories and Applications, Elsevier Science Publishers B.V. (North-Holland) EURASIP, 1983, pp. 191–194.

*Primary Examiner*—Leo H. Boudreau
*Assistant Examiner*—Jose L. Couso
*Attorney, Agent, or Firm*—Spencer & Frank

[57] ABSTRACT

The present invention relates to a method of reducing the quantity of overhead data in image coding wherein the image is subdivided into partial image regions and these partial image regions are characterized by classes. To determine the class, the partial image region is transformed by discrete transformation into the spectral range and the absolute values of the spectral coefficients are then processed in a manner such that all absolute values are compared with their visual discernibility thresholds, singular coefficients are neglected and the result can be represented by term variables, i.e. by a minimum quantity of different individual coefficients. The classes derived from a counter and from a class decoding gate array are compared with the pattern representing the term variables until the first congruent class is found. The associated class code is forwarded for further processing.

4 Claims, 9 Drawing Sheets

|  | TERMS | | | | | | | | | | |
|---|---|---|---|---|---|---|---|---|---|---|---|
| CLASSES | 1 | 2 | 3 | 4 | 5* | 6* | 7* | 8 | 9 | 10 | 11 |
| 1 | X | | | | | | | | | | |
| 2 | X | X | X | | | | | | | | |
| 3 | X | | | | | | | X | | X | |
| 4 | X | X | X | X | | | | X | X | | |
| 5 | X | X | | | | | | X | X | X | X |
| 6 | X | X | X | X | X | | | X | X | X | X |
| 7 | X | X | X | X | X | X | | X | X | X | X |
| 8 | X | X | X | X | X | X | X | X | X | X | X |

| data input | | | data output | |
|---|---|---|---|---|
| VZ | $I_{i-1}$ | $A_i$ | $B_i$ | $I_i$ |
| 0 | - | 0 | 0 | 0 |
| 0 | - | 1 | 1 | 0 |
| 1 | 0 | 0 | 0 | 0 |
| 1 | 0 | 1 | 1 | 1 |
| 1 | 1 | 0 | 1 | 1 |
| 1 | 1 | 1 | 0 | 1 |

FIG. 7A

| counter position (decimal) | threshold decoder outp. (decimal) | counter position (decimal) | threshold decoder outp. (decimal) |
|---|---|---|---|
| 0 | 16 | 34 | 37 |
| 1 | 11 | 35 | 56 |
| 2 | 10 | 36 | 68 |
| 3 | 16 | 37 | 108 |
| 4 | 24 | 38 | 103 |
| 5 | 40 | 39 | 77 |
| 6 | 51 | 40 | 24 |
| 7 | 61 | 41 | 35 |
| 8 | 12 | 42 | 55 |
| 9 | 12 | 43 | 64 |
| 10 | 14 | 44 | 81 |
| 11 | 19 | 45 | 104 |
| 12 | 26 | 46 | 113 |
| 13 | 58 | 47 | 92 |
| 14 | 60 | 48 | 49 |
| 15 | 55 | 49 | 64 |
| 16 | 14 | 50 | 78 |
| 17 | 13 | 51 | 87 |
| 18 | 16 | 52 | 103 |
| 19 | 24 | 53 | 121 |
| 20 | 40 | 54 | 120 |
| 21 | 57 | 55 | 101 |
| 22 | 69 | 56 | 72 |
| 23 | 56 | 57 | 92 |
| 24 | 14 | 58 | 95 |
| 25 | 17 | 59 | 98 |
| 26 | 22 | 60 | 112 |
| 27 | 29 | 61 | 100 |
| 28 | 51 | 62 | 103 |
| 29 | 87 | 63 | 99 |
| 30 | 80 | | |
| 31 | 62 | | |
| 32 | 18 | | |
| 33 | 22 | | |

FIG. 8

| $u_i$ | $s_i$ | $b_i$ | $u_{i+1}$ |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 1 |
| 1 | 1 | 1 | 1 |

| COUNTER POSITION INP. (DECIMAL) | CLASS DECODER OUTPUT (BINARY) |
|---|---|
| 0 | 1 0 0 0 0 0 0 0 0 0 |
| 1 | 1 1 1 0 0 0 0 0 0 0 |
| 2 | 1 0 0 0 0 0 0 1 0 1 0 |
| 3 | 1 1 1 1 0 0 0 1 1 0 0 |
| 4 | 1 1 0 0 0 0 1 1 1 1 |
| 5 | 1 1 1 1 1 0 0 1 1 1 1 |
| 6 | 1 1 1 1 1 1 0 1 1 1 1 |
| 7 | 1 1 1 1 1 1 1 1 1 1 |

METHOD FOR REDUCING THE QUANTITY OF DATA IN IMAGE CODING

BACKGROUND OF THE INVENTION

The present invention relates to a method for reducing the quantity of data in image coding in which, after discrete transformation (e.g. discrete cosine transformation) of a partial image region into the spectral range or domain, all spectral coefficients are compared with previously determined visual discernibility thresholds, which are adapted to human eye perception, and the comparison result furnishes the information as to which spectral coefficients must be transmitted and which may be neglected.

Since the image information after the comparison for a square partial image of the size of n x n spectral coefficients is composed of a binary word having a length of n×n, in order to provide a representation of 2exp [n×n]combinations of threshold passages, classification methods have been developed in order to reduce the quantity of over head data which must be transmitted. Such classification causes the quantity of possible combinations to be imaged in, for example 2 exp [3]classes, so as to reduce this additional overhead data quantity from one bit per spectral coefficient to 3/(n×n) bits per spectral coefficient.

The problems of very long transmission times which occur during the transmission of individual video pictures over narrowband transmission channels operating with low transmission rates, have evolved many proposals in the literature to reduce these difficulties. For example, an article by H. Lohscheller, "A Subjectively Adapted Image Communication System" IEEE TRANSACTIONS ON COMMUNICATIONS, Vol. Com-32, No. 12, Dec., 1984, pages 1316–1322, discloses a classification method which can be used for this purpose. However, this classification method can be implemented only by performing multiplications, so that the costs for its realization are considerable.

SUMMARY OF THE INVENTION

It is an object of the present invention to provide a classification method of the above-mentioned type which does not subjectively discernibly influence the quality of the reconstructed video signal and which can be realized less expensively than was possible in the past.

The above object is achieved according to the present invention by a method for reducing the quantity of image overhead data to be transmited using image coding including the steps of subdividing each image into partial image regions, discretely transforming the image information of each partial image region from the local range or domain into the spectral range or domain to produce spectral coefficients, classifying each partial image region, using the spectral coefficient, so that each partial image region is characterized by one of predesignated ordered classes, and utilizing the class characterization information for the partial image regions to determine which spectral coefficients must be transmitted, wherein the step of classifying comprises: forming the absolute values from the spectral coefficients of a partial image region; comparing the absolute values of the spectral coefficients, value for value, with previously determined corresponding visual discernibility thresholds to provide a logic 0 if a spectral coefficient is less than its corresponding visual discernibility threshold and a logic 1 if a spectral coefficient is greater or equal to its corresponding visual discernibility threshold; intermediately storing the binary comparison results of the step of comparing in a shift register as a binary sequence pattern of logic 0's and logic 1's representing the partial image region; using an operator on the intermediately stored comparison results and processing the resulting representation of the matrix-shaped partial image region onto the vector-shaped representation in the shift register by means of an operator mask to obtain a modified binary sequence pattern of logic 0's and logic 1's representing the partial image region; storing the modified sequence pattern in a further shift register; by means of a term gate array connected to the further shift register, forming term variables of a predetermined set of terms from the modified binary sequence pattern, with the terms having been selected as minimum quantities from which all preceding classes can be easily compiled and distinguished; sequentially generating binary signals corresponding to the ordered classes by means of a class decoder; comparing the outputs from the class decoder and from the logical term gate array with one another until the first one of the ordered classes has been found which is congruent with the term formed by the logic term gate array; and identifying the thus found class by a class code which is forwarded in this form for further processing.

According to the preferred embodiment of the invention; the step of using an operator comprises: providing an operator mask containing a 3×3 matrix corresponding to a central bit representing the spectral coefficient and eight surrounding environmental bits representing the spectral coefficients of a partial image region; applying the mask in succession to each of the spectral coefficients stored in the mask shift register with the respective spectral coefficient corresponding to the central bit; for each application of the mask to a spectral coefficient, adding the binary values of the corresponding eight environmental bits, comparing the result of the addition with a threshold value to produce a logic 1 if the result is greater or equal to the threshold value or a logic 0 if the result is less than the threshold value, and combining the binary comparison result with the binary spectral coefficient of the central bit of the mask in such a manner that the value of the central bit of the mask is maintained when the result will be a logic 1 and otherwise set to logic 0 and feeding the maintained value to the further shift register for storage.

BRIEF DESCRIPTION OF THE DRAWINGS

The invention will be described in greater detail below for one embodiment and with reference to drawing figures, wherein.

DETAIL DESCRIPTION OF THE PREFERRED EMBODIMENTS

As indicated above, the present invention is directed to an improved method for reducing the quantity of overhead data to be transmitted using image coding of the type wherein the image is subdivided into partial image regions, the image information is discretely transformed from the pixel or spatial domain into the spectral range or domain, e.g., by discrete cosine transformation, to provide spectral coefficients for the pixels of the partial image region, the partial image regions are classified or identified, on the basis of the spectral coefficients, as being characterized by one of an ordered set of classes, and the identified class information is used to reduce the spectral coefficient overhead data which must be transmitted to in order to be able to reproduce the partial image region at a receiver. Such systems are generally well known in the art, for example, see the above mentioned article by H. Lohscheller and the article by W. Chen et al, "Scene Adaptive Coder", IEEE TRANSACTIONS ON COMMUNICATIONS, Vol. COM-32, No. 3, Mar. 1984, pages 225-232, and accordingly are not described in detail here. Therefore, the description which follows is directed to the improved classification process according to the invention.

Figure 1:
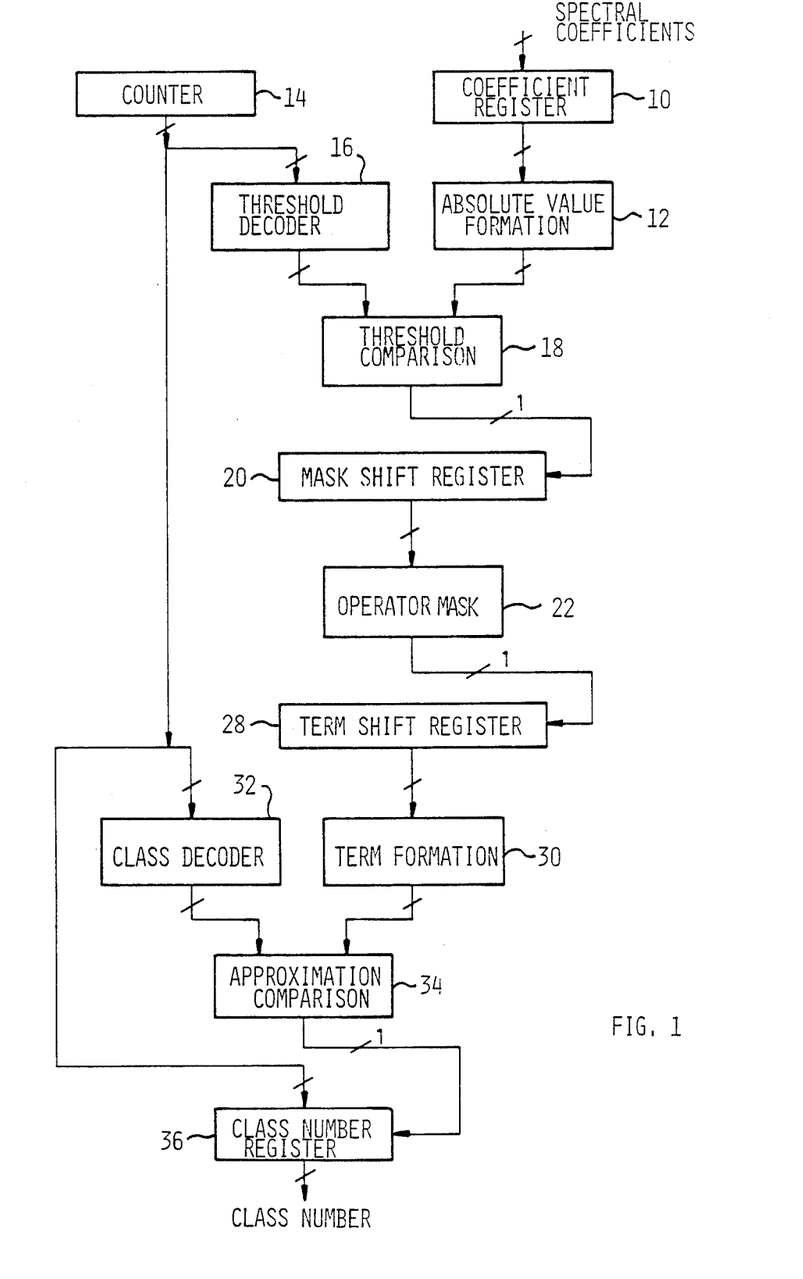
FIG. 1 is the block circuit diagram of a classifier for carrying out the method according to the invention.

As shown in FIG. 1, in a first processing step of the classification process according to the invention, the spectral coefficients determined in a conventional manner for a partial image region by discrete transformation are used as input data which are written successively into a coefficient register 10. Thereafter, the absolute value of this spectral coefficient is formed in a conventional manner in a circuit 12.

At the same time, a counter 14, with the aid of a threshold decoding gate array 16, derives the visual discernibility threshold associated with the value of the spectral coefficient in a conventional manner.

The outputs of the circuit 12 and the threshold decoder 16 are fed to a threshold comparison circuit 18 which then compares the value of the spectral coefficient with the corresponding visual discernibility threshold. The results of the comparison is then available at the output of this threshold comparison circuit 18 in the form of a logic 0 or a logic 1 and is written into a mask shift register 20. A logic 0 here indicates that the value of the spectral coefficient is less than its visual discernibility threshold and a logic 1 means, accordingly, that the spectral coefficient value is greater than or equal to its visual discernibility threshold. This comparison in the circuit 18 is sequentially carried out for all spectral coefficient values of a partial image region until all comparison values are written into the mask shift register 20 which then contains a binary pattern of the values exceeding the threshold.

Figure 4:
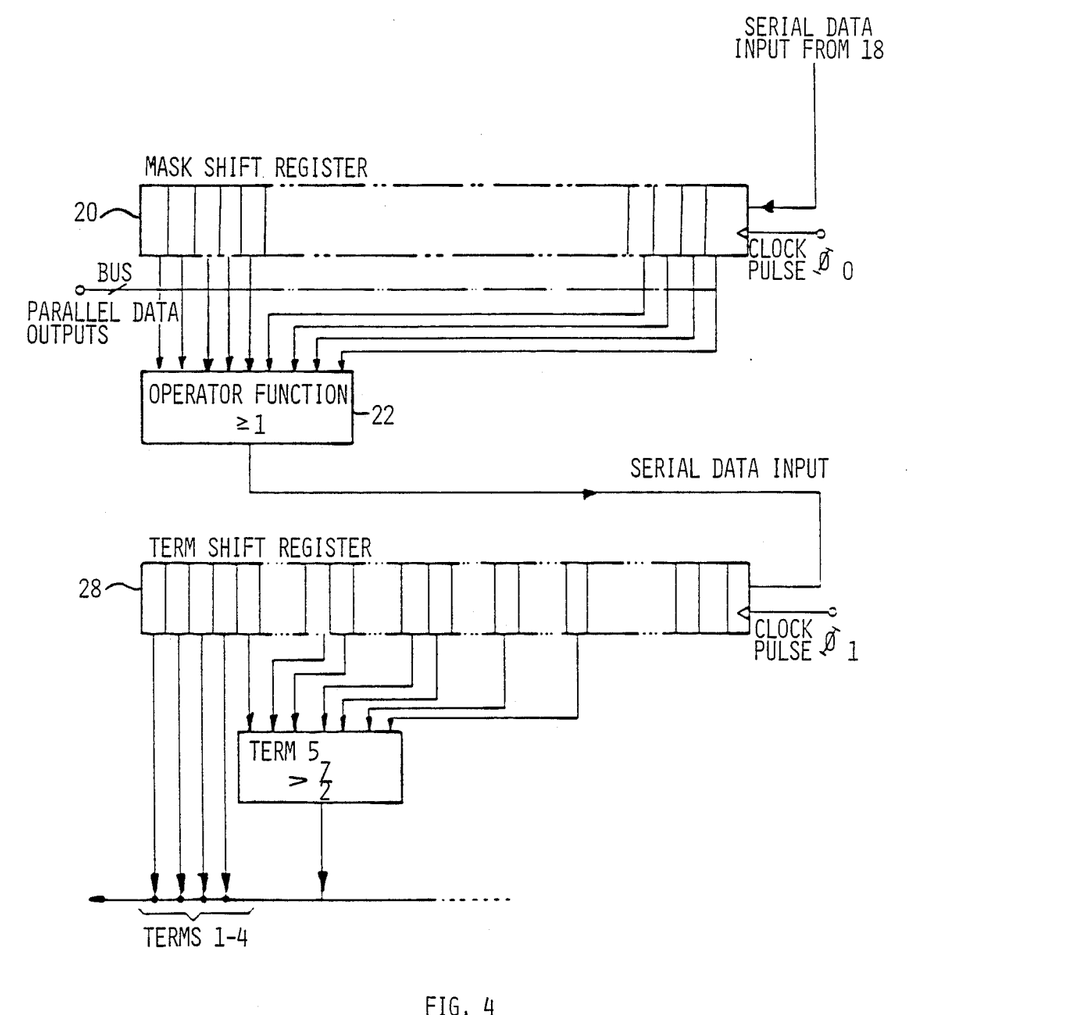
FIG. 4 is a block circuit diagram for the realization of the operator function employing the data in the mask shift register and for term formation from the data in the term register for, for example, 8 classes.
Figure 5:
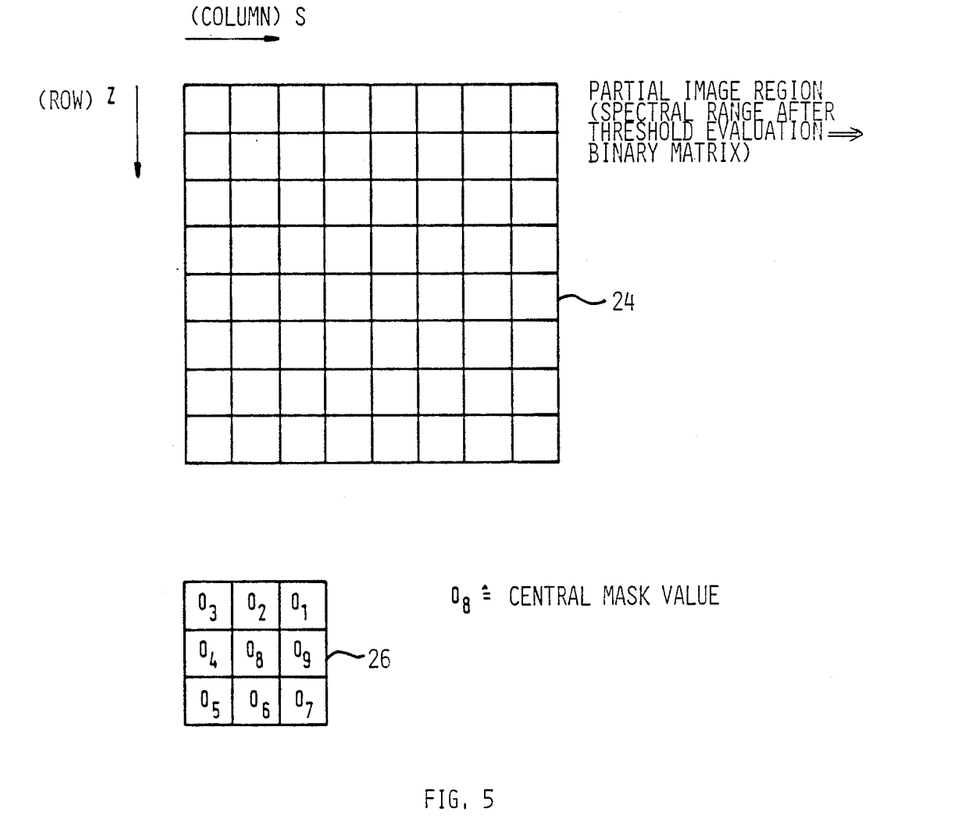
FIG. 5 is a schematic illustration of the operator mask used according to the invention.

In a second processing step, the content of the mask shift register 20 is now fed via parallel outputs, as shown more clearly in FIG. 4, to an operator gate array 22, wherein a binary matrix stored in mask shift register 20 and representing the spectral coefficients of the partial image region is in effect passed under an operator mask. As shown in FIG. 5, the binary matrix 24 of the spectral values, which as shown is composed of eight rows Z and eight columns S, is passed under an operator mask or window 26 which is only a 3×3 matrix and thus will contain only nine bits representing the spectral coefficients, i.e. a central mask value $0_8$ and eight surrounding values $0_1$–$0_7$ and $0_9$ corresponding to the surrounding environment bits of a central bit representing a spectral coefficient.

In each mask processing step, the mask 26 is effectively centered over one binary element representing a spectral coefficient of the matrix 24 and the binary elements representing all eight of the surrounding environment spectral coefficients ($0_1$–$0_7$ and $0_9$) are added. The result or sum of this addition is compared with a threshold value and a binary logic 1 is produced if the sum is greater or equal to the threshold value and a logic 0 is produced if the sum is less than the threshold value. The binary comparison result is combined with the central mask value according to FIG. 11 and the outcome is then stored in a term shift register 28 (FIGS. 1 and 4) as the new central mask value $0^1{}_8$) instead of the old central mask value. In this way, singular bits representing the spectral values are suppressed. When all bits representing spectral coefficient values have passed underneath this mask 26, a modified binary pattern representing the partial image region is stored in the term shift register 28.

By means of a logical term gate array 30, having inputs connected in various combinations to selected memory locations of the term shift register 28, a plurality of, for example, eleven, different term variables (Ts), which represent a partial image region in the form of a certain combination of term variables (Ts), are produced from the modified binary pattern in the term shift register 28. In the preferred illustrated embodiment of the invention, the eleven different term variables shown in FIG. 3 can be produced by the term formation or term gate array 30.

Figure 3:
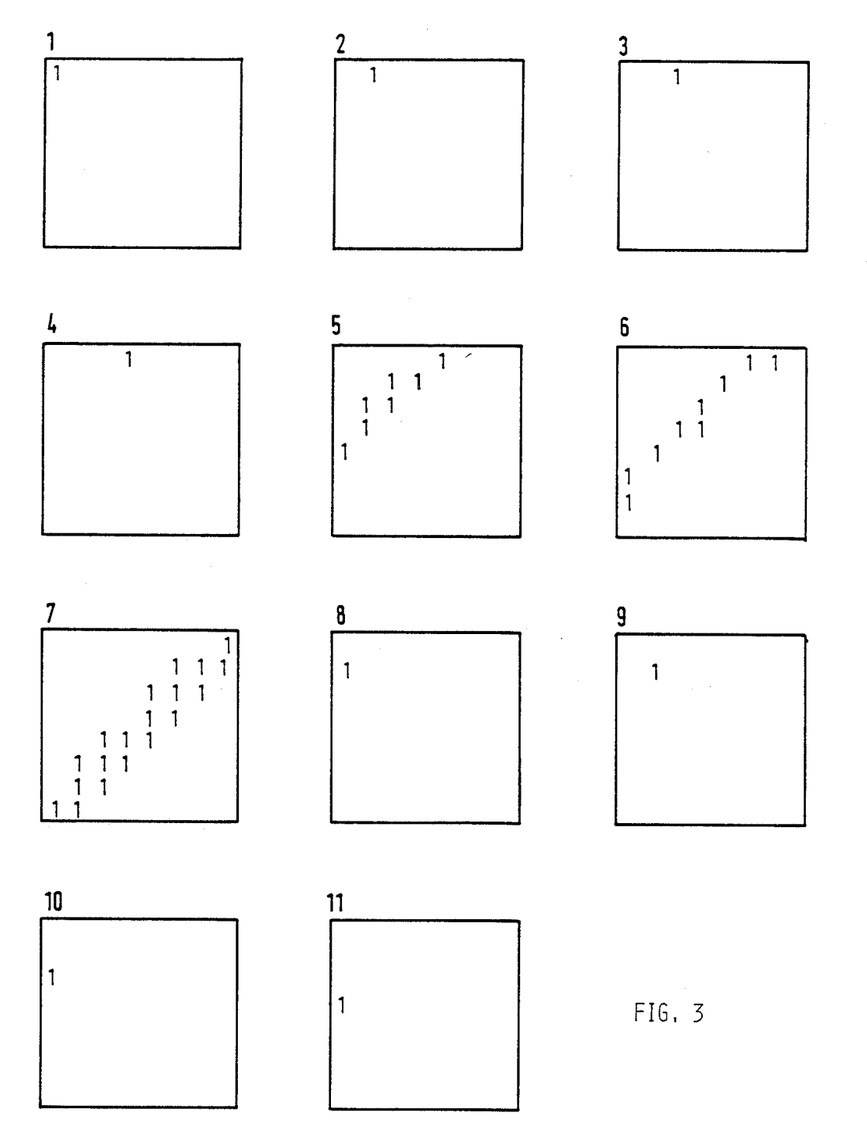
FIG. 3 shows a term classification for a classification process according to the invention employing the 8 classes of FIG. 2.

The manner of generating term variables 1 to 4 and 5 according to FIG. 3 is shown in FIG. 4. As can be seen from FIG. 3, each of term variables 1 to 4 contains only a single logic 1 at a particular location of the matrix and accordingly these term variables are produced by direct advancement of the binary values in the corresponding memory locations in the term shift register 28. Term variables 8 to 11, which likewise contain only one logic 1, are formed in a similar manner. Term variable 5, on the other hand, contains seven logic variable bits and accordingly term variable 5 is produced from the seven corresponding memory locations in the term shift register 28 with the aid of a majority decision ≧7/2. The term variables 6 and 7 of FIG. 3 are generated in a manner similar to that for term variable 5.

Figure 2:
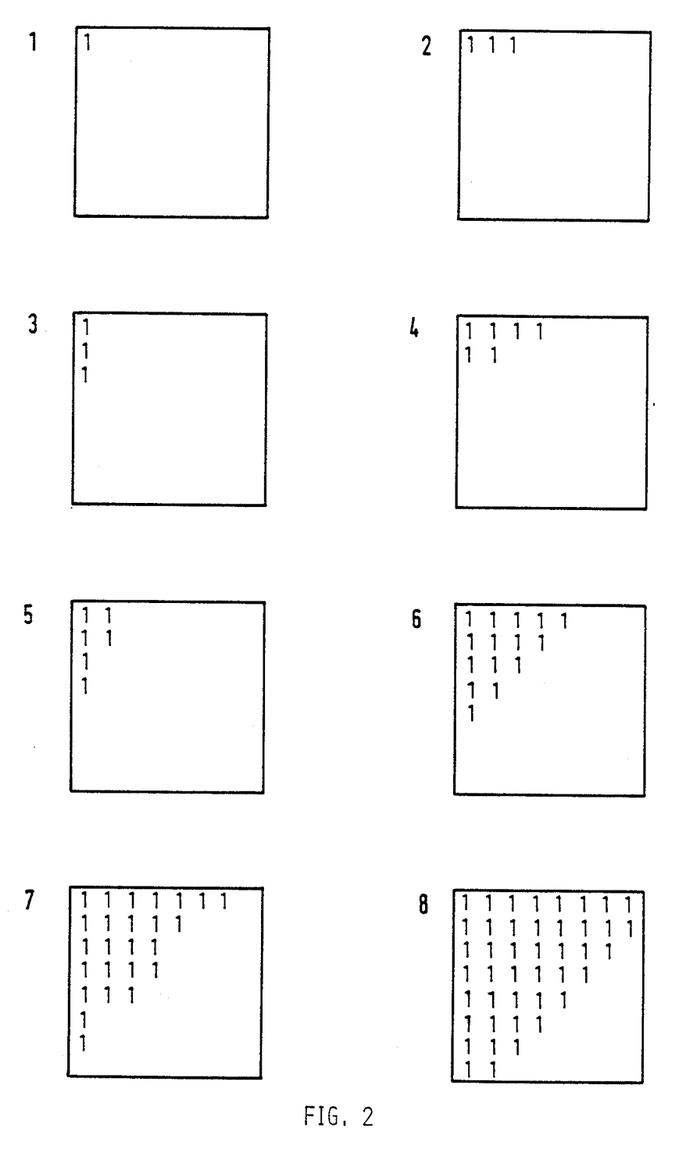
FIG. 2 shows a possible classification into 8 classes for use in explaining the invention.

The terms Ts of FIG. 3 were generated or derived from the ordered classification Ks shown in FIG. 2 and are the minimum quantities from which the classes are compiled and which provide a distinction between all classes.

The terms are determined in view of the class designation under the following rules (see FIGS. 2, 3 and 6): all classes should be derivable from the terms selected, all classes have to be discernible, the terms may not overlap one another. According to these rules the class designation in FIG. 2, found experimentally, provides only those terms shown in FIG. 3.

In the next processing step, the class variable is then formed from the count of the counter 14 with the aid of a class decoding gate array 32 and these class variables are compared with the term vaiables in a logical approximation gate array 34 in that a check is made as to whether all class variables are congruent with the corresponding term variables. No congruence exists if a class variable at the memory location in question has the logic value 0 and the corresponding term variable at the memory location in question has the logic value 1. In all other cases, congruence exists. Congruence corresponds to logic implication.

Figure 6:
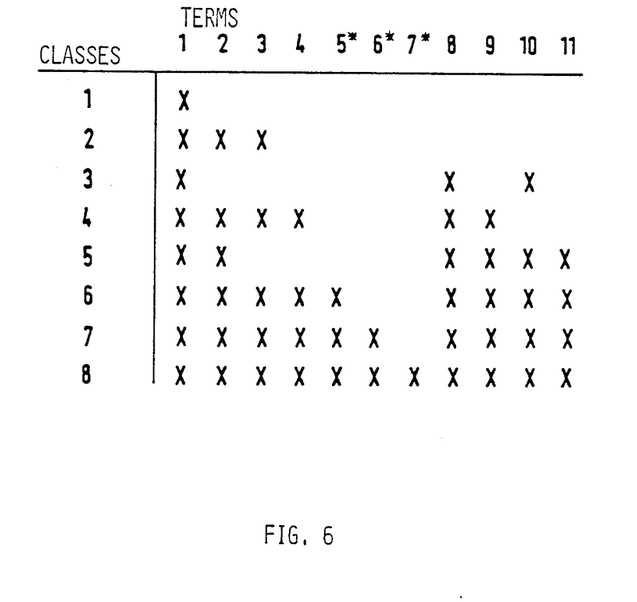
FIG. 6 is a table showing the congruence of the classes by way of term variables (classes and terms shown as term variables) according to the invention.

This approximation comparison is carried out in the gate array 34 until the first one of the ordered classes has been found which is congruent with all term variables. The last class is always congruent with all term variables. A table showing congruance for the classes of FIG. 2 and the term variables of FIG. 3 is shown in FIG. 6.

The count of the counter 14 from which the first class which produced congruence was decoded is stored as the class code in a class number register 36 and is made available as an output data for further processing.

Figure 7:
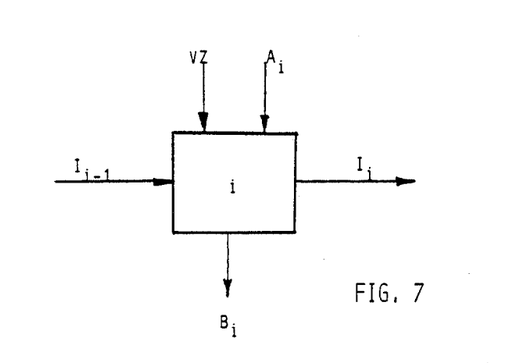
FIG. 7 is a block circuit diagramm of an elementary cell of the cascaded absolute value formation unit 12 of FIG. 1.

Now the block units shown in FIG. 1 are explained more detailed. The units 12, 16, 18, 22 and 32 consist of logical gate arrays comprising logical AND or OR gates which can be generally described by their truth tables. In FIG. 7 an elementary cell i of the cascaded absolute value formation unit 12 is shown. The inputs $A_i$, VZ, $I_{i-1}$ represent $A_i$ : binary position i of a two's complement number
VZ : sign
$I_{i-1}$ : output signal of the preceding elementary cell
and the outputs
$B_i$ : absolute value at binary position i of the input word (output of coefficient register 10)
$I_i$ : carry out for the following higher position of the input word.

Figure 7A:
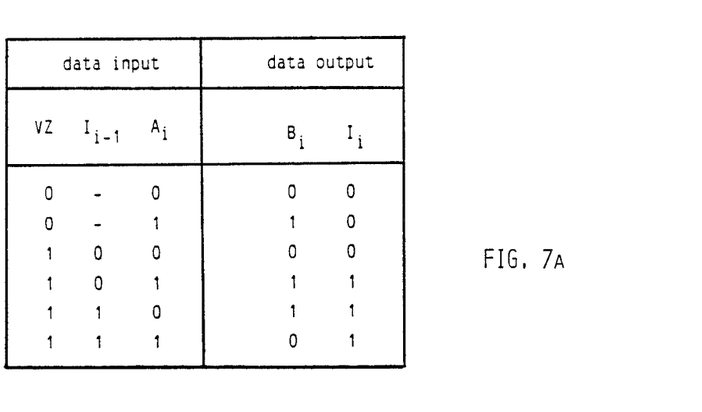
FIG. 7a is a truth table for the circuitry according to FIG. 7.
Figure 8:
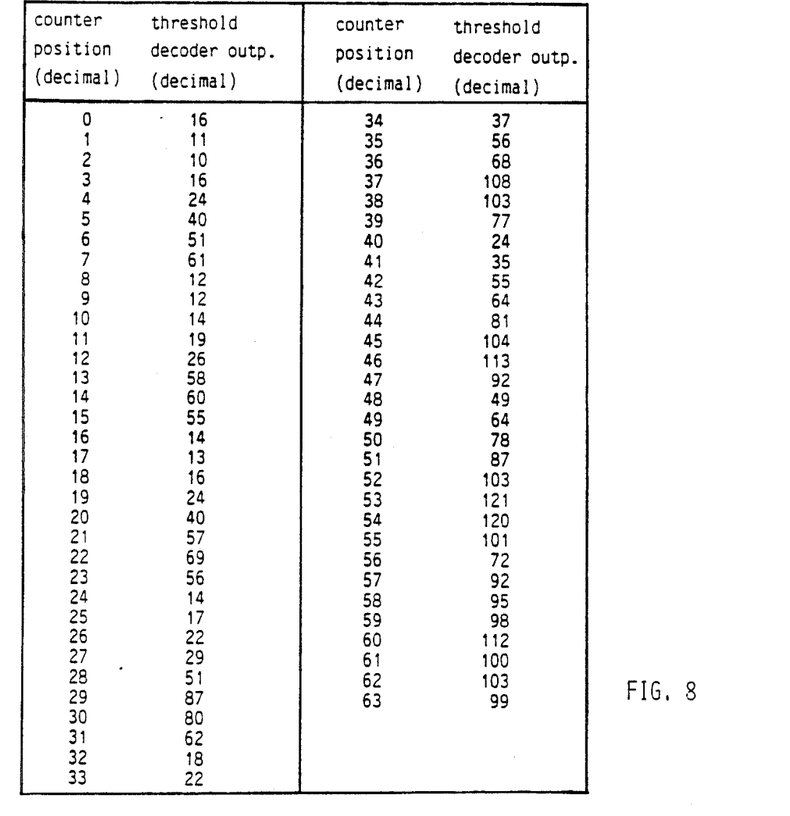
FIG. 8 is a decoding table for the threshold decoder 16 of FIG. 1.
Figure 9:
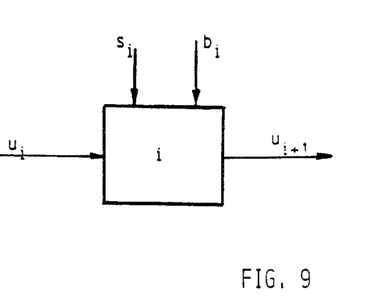
FIG. 9 is a block circuit diagramm of an elementary cell of the cascaded threshold comparison circuit 18 of FIG. 1.

The truth table for the elementary cell i of FIG. 7 is shown in FIG. 7a. In FIG. 8 the decoding table of the threshold decoder gate array 16 is shown. According to the counter position of counter 14 threshold decoder gate array 16 has an output representing threshold values corresponding to the decoding table. An elementary cell i of threshold comparison circuit 18 is shown in FIG. 9, with the inputs $s_i$ : binary position i of threshold word
$b_i$ : binary position i of absolute value word
$u_i$ : output of preceding elementary cell and the output
$u_{i+1}$ : carry out for the following higher position comparison.

Figure 10:
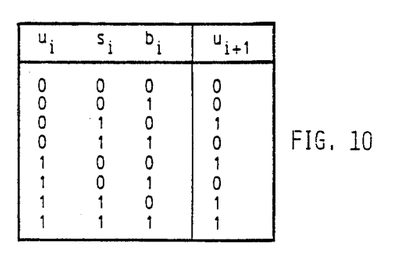
FIG. 10 is a truth table for the circuitry according to FIG. 9.

The truth table for the threshold comparison circuit 18 is shown in FIG. 10.

Figure 11:
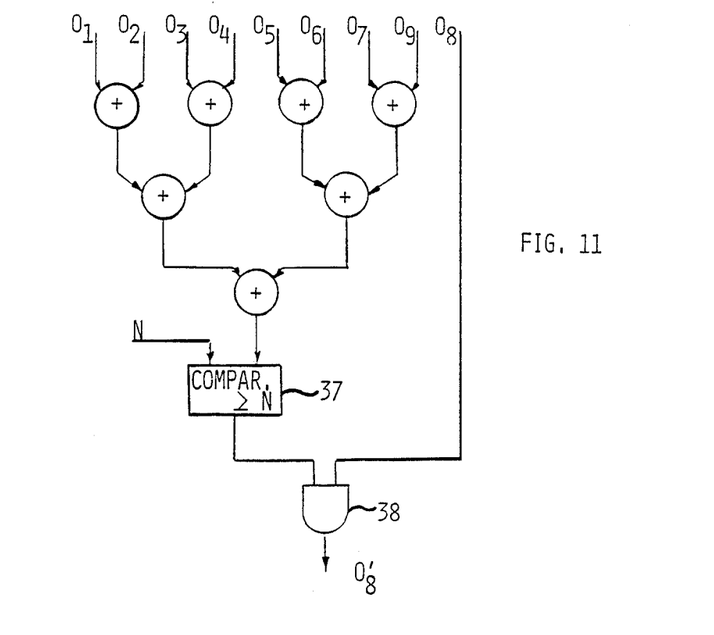
FIG. 11 illustrates the structure of the operator mask.
Figure 12:
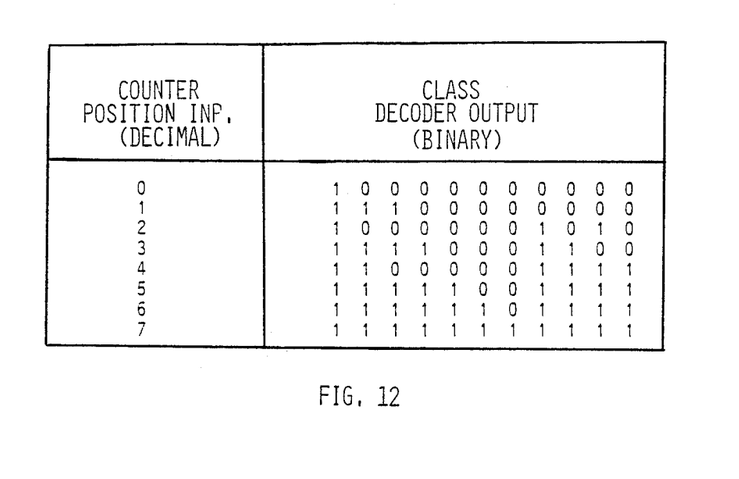
FIG. 12 is a truth table of the class decoder 32 of FIG. 1.

The general structure of the operator mask array 22 is shown in FIG. 11. $0_1 \ldots 0_9$ representing the binary positions as mask inputs. Every two of the surrounding values $0_1 \ldots 0_7$ and $0_9$ are fed to adding stages and the outputs of these adding stages are added by means of further adding stages and so on until only one sum can be fed to a comparison stage 37. In comparison stage 37 the sum of the surrounding values $0_1 \ldots 0_7$ and $0_9$ is compared with a threshold value N. If the sum is greater or equal to the threshold value a logical 1 is fed to AND gate 38. The central mask value $0_8$ is also fed to AND gate 38. The output of AND gate 38 represents a new central mask value $0^1{}_8{}'$. Class decoder 32 is also a logical gate array. Its truth table is shown in FIG. 12. The approximation comparison unit 34 is a logical gate array enabling the boolean expression for every binary position:

$\overline{x_2} + x_1$ with $x_1$ and $x_2$ being class and term variables.

All comparison operation necessary for carrying out the method according to the steps of FIG. 1 can be achieved by state of art principles, for example disclosed in "Logischer Entwurf digitaler Systeme" by W. Giloi and H. Liebig, Springer Verlag, Berlin-Heidelberg-New York 1973, Library of Congress Catalog Card Number 72-93418, pages 142-145. The registers 10, 20, 28 and 36 are commonly used state of art digital registers.

It will be understood that the above description of the present invention is susceptible to various modifications, changes and adaptations, and the same are intended to be comprehended within the meaning and range of equivalents of the appended claims.

What is claimed is:

1. In a method for reducing the quantity of image data to be transmitted using image coding including the steps of subdividing each image into matrix shaped partial image regions of NXN pixels, discretely transforming the image data of each of said partial image regions from a pixel domain into a spectral domain to produce spectral coefficients, classifying each of said partial image regions, using said spectral coefficients, so that each of said partial image regions is characterized by one of predesignated ordered classes, and utilizing the class characterization for the partial image regions to determine which spectral coefficients must be transmitted; the improvement wherein said step of classifying comprises:

forming absolute values from the spectral coefficients of a partial image region;

comparing the absolute values of said spectral coefficients, value for value, with previously determined corresponding visual discernibility thresholds to provide a logic 0 if a spectral coefficient is less than its corresponding visual discernibility threshold and a logic 1 if a spectral coefficient is greater or equal to its corresponding visual discernibility threshold;

intermediately storing the binary comparison results of said step of comparing in a first shift register as a binary bit sequence pattern of logic 0's and logic 1's representing said spectral coefficients of said a partial image region;

using an operator on each binary bit of said sequence pattern stored in said first shift register to suppress singular binary bits representing said spectral coefficients and to obtain a modified binary sequence pattern of logic 0's and logic 1's representing the partial image region;

storing said modified binary bit sequence pattern in a further shift register;

by means of a logical term gate array connected to said further shift register, forming output signals corresponding to term variables of a predetermined set of terms from said modified binary bit sequence pattern, with said terms having been selected as minimum quantities from which all preceding of said ordered classes can be easily compiled and distinguished;

sequentially generating binary signals corresponding to said ordered classes by means of a class decoder;

comparing the output signals from the class decoder and from the logical term gate array with one another until a first one of the ordered classes has been found which is congruent with a term formed by the logical term gate array; and identifying said first one of the ordered classes by a class code which is forwarded in this form for further processing.

2. A method as defined in claim 1 wherein said step of using an operator comprises:

providing an operator mask containing a 3×3 matrix corresponding to a central binary bit representing a spectral coefficient and eight surrounding environment binary bits representing spectral coefficients of a partial image region; applying the operator mask in succession to each of the bits representing spectral coefficients stored in said first shift register with the respective bit representing a spectral coefficient to which the mask is applied corresponding to said central bit; and for each application of said mask to a bit representing a spectral coefficient, adding the binary values of the corresponding eight surrounding environment bits representing their spectral coefficients, comparing the result of the addition with a threshold value to produce a logic 1 if said result is greater or equal to the threshold value or a logic 0 if the result is less than the threshold value, combining the binary comparison result with the binary value of the central bit of the mask in such a manner that the value of the central bit of the mask is maintained when the result will be a logic 1 and otherwise set to logic 0, and feeding the maintained value to said further shift register for storage.

3. A method as defined in claim 1 wherein said step of using an operator includes:

for each respective binary bit, adding all of the binary bits of said sequence pattern which correspond to environment spectral coefficients surrounding the spectral coefficient represented by the respective said binary bit in said matrix shaped partial image region, whereby the respective said binary bit is the central bit of a matrix shaped operator window, comparing the sum of said step of adding with a threshold value to provide a further binary bit representing the comparison result, and logically combining further binary bit representing the comparison result with the respective said central bit to provide a binary bit of said modified binary sequence pattern.

4. A method as defined in claim 3 wherein: said step of comparing the sum of said step of adding with a threshold value includes producing an output signal which is a logic 1 if said sum is greater or equal to the threshold value and a logic 0 if said sum is less than the threshold value; and said step of logically combining includes feeding said central bit and said output signal produced by said step of comparing the sum to an AND-gate.

* * * * *